US011835776B2

(12) United States Patent
Shima (10) Patent No.: US 11,835,776 B2
(45) Date of Patent: Dec. 5, 2023

(54) FILTER DEVICE AND LASER APPARATUS (71) Applicant: Fujikura Ltd., Tokyo (JP)

(72) Inventor: Kensuke Shima, Sakura (JP)

(73) Assignee: Fujikura Ltd., Tokyo (JP)

( * ) Notice: Subject to any disclaimer, the term of this patent is extended or adjusted under 35 U.S.C. 154(b) by 106 days.

(21) Appl. No.: 17/427,276

(22) PCT Filed: Dec. 9, 2019

(86) PCT No.: PCT/JP2019/048064
§ 371 (c)(1),
(2) Date: Jul. 30, 2021

(87) PCT Pub. No.: WO2020/170560
PCT Pub. Date: Aug. 27, 2020

(65) Prior Publication Data
US 2022/0146765 A1 May 12, 2022

(30) Foreign Application Priority Data

Feb. 21, 2019 (JP) .................................. 2019-029578

(51) Int. Cl.
*G02B 6/42* (2006.01)
*H01S 3/094* (2006.01)
*H01S 3/0941* (2006.01)

(52) U.S. Cl.
CPC ........ *G02B 6/4215* (2013.01); *H01S 3/09415* (2013.01); *H01S 3/094003* (2013.01)

(58) Field of Classification Search
CPC ............. G02B 6/4215; H01S 3/094003; H01S 3/09415
See application file for complete search history.

(56) References Cited

U.S. PATENT DOCUMENTS 5,323,404 A * 6/1994 Grubb ................... H01S 3/0675
359/345
6,434,172 B1 * 8/2002 DiGiovanni ............ H01S 3/302
372/102

(Continued)

FOREIGN PATENT DOCUMENTS

CN 1314597 A 9/2001
CN 101839759 A 9/2010

(Continued)

OTHER PUBLICATIONS

Koplow et al., Single-mode operation of a coiled multimode fiber amplifier, Opt. Lett. 25, 442-444 (2000) (Year: 2000).*

(Continued)

*Primary Examiner* — Peter Radkowski
(74) *Attorney, Agent, or Firm* — Osha Bergman Watanabe & Burton LLP (57) ABSTRACT A filter device includes: an optical fiber that allows light having a predetermined wavelength to propagate in multimode; a first higher-order mode filter that removes at least part of the light in any higher order mode than a predetermined mode in the light in the multimode propagating in the optical fiber; and a fiber Bragg grating that transmits the light having the predetermined wavelength and reflects light having a particular wavelength longer than the predetermined wavelength.

7 Claims, 2 Drawing Sheets (56) References Cited

U.S. PATENT DOCUMENTS

| | | | | |
|---|---|---|---|---|
| 6,496,301 | B1* | 12/2002 | Koplow | G02B 6/14 359/337.2 |
| 2004/0086245 | A1* | 5/2004 | Farroni | G02B 6/024 385/142 |
| 2005/0123007 | A1* | 6/2005 | Rice | H01S 3/067 372/19 |
| 2011/0058250 | A1 | 3/2011 | Liu et al. | |
| 2011/0122902 | A1 | 5/2011 | Shima | |
| 2014/0036938 | A1 | 2/2014 | Nakai | |
| 2016/0111851 | A1* | 4/2016 | Kliner | H01S 3/0675 359/334 |
| 2016/0226220 | A1* | 8/2016 | Kanskar | G02B 6/02042 |

FOREIGN PATENT DOCUMENTS

| | | |
|---|---|---|
| CN | 102265472 A | 11/2011 |
| CN | 104112970 A | 10/2014 |
| CN | 104718474 A | 6/2015 |
| CN | 105009387 A | 10/2015 |
| CN | 105044030 A | 11/2015 |
| CN | 108963738 A | 12/2018 |
| EP | 2975704 A1 | 1/2016 |
| EP | 3624278 A1 | 3/2020 |
| JP | 2002-006348 A | 1/2002 |
| JP | 2007-123477 A | 5/2007 |
| JP | 2010-518632 A | 5/2010 |
| WO | 2014/141766 A1 | 9/2014 |
| WO | 2018/008251 A1 | 1/2018 |
| WO | 2018/207615 A1 | 11/2018 |
| WO | 2019/021565 A1 | 1/2019 |

OTHER PUBLICATIONS

Lee et al., Fiber mode conversion with tilted gratings in an optical fiber, J. Opt. Soc. Am. A 18, 1176-1185 (2001) (Year: 2001).*

Zhang et al., All-fiber high-order mode laser using a metal-clad transverse mode filter, Opt. Express 26, 29679-29686 (2018) (Year: 2018).*

Zlobina et al., Nearly single-mode Raman lasing at 954 nm in a graded-index fiber directly pumped by a multimode laser diode, Opt. Lett. 42, 9-12 (2017) (Year: 2017).*

International Search Report issued in corresponding International Patent Application No. PCT/JP2019/048064 dated Jan. 21, 2020 (3 pages).

* cited by examiner

FILTER DEVICE AND LASER APPARATUS

TECHNICAL FIELD

The invention relates to a filter device and a laser apparatus that enable inhibition of local heat generation.

BACKGROUND

A fiber laser apparatus is used in various fields, such as a laser processing field and a medical field since the fiber laser apparatus enables high optical power density in a small beam spot due to its excellent light condensing property.

In recent years, the power of light emitted from fiber laser systems has increased, an increase in the power density of light that propagates in an optical fiber is likely to cause Stokes light due to stimulated Raman scattering (SRS). Generating of such Stokes light causes easy transition of energy from proper light that the fiber laser apparatus emits to the Stokes light, thus, the power of the Stokes light tends to increase even in an optical fiber having no function of amplifying light. Therefore, in a case where Stokes light is generated, preferably, the Stokes light is removed while the Stokes light is small in power.

Patent Literature 1 discloses a fiber laser apparatus provided with a plurality of slanted fiber Bragg gratings (FBGs). In the fiber laser apparatus, each FBG reflects Stokes light outward from the core.

PATENT LITERATURE

[Patent Literature 1] US Patent Application Publication No. 2016/0111851

A FBG has a plurality of high-refractive-index portions higher in refractive index than the core out of a portion provided with the FBG and a plurality of low-refractive-index portions equivalent in refractive index to the core, each high-refractive-index portion and each low-refractive-index portion alternating with each other. In a typical FBG, the interface between each high-refractive-index portion and each low-refractive-index portion is provided orthogonally to the longitudinal direction of the core. In this case, when the effective refractive index of the core is defined as $n_{eff}$, the period of the FBG along the longitudinal direction of the core is defined as $\Lambda$, and the wavelength of light that propagates in the core is defined as $\lambda$, at least part of the light having the wavelength $\lambda = 2n_{eff}\Lambda$ incident on the FBG is reflected in the exact opposite direction to the incident direction to the FBG. In some cases, depending on the refractive index of the high-refractive-index portions or the number of the high-refractive-index portions, almost all the light having the wavelength $\lambda = 2n_{eff}\Lambda$ can be reflected in the exact opposite direction to the incident direction to the FBG. Part of the light having the wavelength $\lambda < 2n_{eff}\Lambda$ incident on the FBG is reflected at a specific angle relative to the exact opposite direction to the incident direction to the FBG. A larger difference between $\lambda$ and $2n_{eff}\Lambda$ increases the angle.

For example, a fiber laser apparatus is provided with a FBG that reflects Stokes light due to stimulated Raman scattering occurring from signal light in response to transmission of the signal light, in the exact opposite direction to the incident direction to the FBG, to inhibit the Stokes light from propagating to the downstream side of the FBG in the propagation direction of the signal light. In this case, because the wavelength of the signal light is shorter than the wavelength of the Stokes light, it is found that part of the signal light is reflected at a specific angle relative to the exact opposite direction to the incident direction to the FBG. As above, a phenomenon in which part of signal light is reflected at a specific angle relative to the exact opposite direction to the incident direction to a FBG, occurs in a slanted FBG that reflects Stokes light at a specific angle relative to the longitudinal direction of an optical fiber. In a case where such signal light reflected at a specific angle exceeds the numerical aperture (NA) of the core, the reflected signal light propagates in the cladding, resulting in being cladding-mode light. Typically, the cladding of an optical fiber is covered with a sheath made of resin. Thus, cladding-mode light is absorbed into the sheath of the cladding, resulting in being heat. In a case where the power of signal light is large such as in a high-power fiber laser apparatus, the sheath is likely to be damaged even though the ratio of the signal light as cladding-mode light reflected by a FBG as above is small, because the energy thereof is large.

SUMMARY

One or more embodiments of the invention provide a filter device and a laser apparatus that enable inhibition of local heat generation.

A filter device according to one or more embodiments of the invention includes: an optical fiber that allows light having a predetermined wavelength to propagate in multimode; a higher-order mode filter that removes at least part of the light in any higher order mode than a predetermined mode in the light in the multimode propagating in the optical fiber; and a fiber Bragg grating (FBG) that transmits the light having the predetermined wavelength and reflects light having a particular wavelength longer than the predetermined wavelength.

As above, the filter device transmits the light having the predetermined wavelength therethrough and inhibits transmission of the light having the particular wavelength longer in wavelength than the light having the predetermined wavelength, thus, the light having the particular wavelength can be inhibited from being propagated through the filter device. Even such a FBG that reflects light having a particular wavelength longer than a predetermined wavelength as above now reflects part of light having the predetermined wavelength shorter than the particular wavelength, at a specific angle relative to the exact opposite direction to the incident direction to the FBG. As the mode of light gets higher in order, the optical confinement ability of a core is low. Therefore, a higher-order mode of light in such light reflected at a specific angle as above tends to be cladding-mode light. Thus, in the filter device, the light having the predetermined wavelength propagates to the FBG through the higher-order mode filter. Thus, before the light having the predetermined wavelength enters the FBG, at least part of the light in any higher order mode than the predetermined mode in the light having the predetermined wavelength can be removed in advance by the higher-order mode filter. Thus, the power of a higher-order mode of light is inhibited in the light incident on the FBG. Therefore, the power of a higher-order mode of light that tends to be cladding-mode light is inhibited in the light having the predetermined wavelength reflected at a specific angle relative to the exact opposite direction to the incident direction to the FBG.

Therefore, the filter device according to one or more embodiments of the invention enables, even in a case where the light reflected by the FBG becomes cladding-mode light, inhibition of the power thereof, thus, local heat generation can be inhibited.

The FBG may be of a slanted type.

In this case, the light having the particular wavelength reflected by the FBG can be emitted in a particular direction in accordance with the slant angle of the FBG. Therefore, unnecessary light can be inhibited from returning to the core.

In one or more embodiments, the higher-order mode filter is a section bent with a predetermined diameter in the optical fiber.

In this case, the higher-order mode filter can be achieved with a simple configuration.

The higher-order mode filter may remove the light in any higher order mode than $LP_{11}$ mode.

Such a configuration enables inhibition of the power of the light in $LP_{02}$ mode, the light in $LP_{21}$ mode, and the light in any other higher-order modes, so that an improvement can be made in beam quality.

In this case, the higher-order mode filter may remove the light in any higher order mode than $LP_{01}$ mode.

Such a configuration enables inhibition of the power of the light in $LP_{11}$ mode and the light in any other higher-order modes, so that a further improvement can be made in beam quality.

In one or more embodiments, the light having the particular wavelength is Stokes light of the light having the predetermined wavelength.

In this case, at the time of propagation of the light having the predetermined wavelength and having a large power in the optical fiber, the Stokes light generating from the light having the predetermined wavelength can be inhibited from propagating through the filter device. Therefore, for example, in a case where a laser apparatus has signal light large in power and the signal light causes Stokes light, the filter device is useful.

In one or more embodiments, the filter device is provided with a pair of the higher-order mode filters, and the FBG is interposed between the pair of the higher-order mode filters.

In this case, the power of the light in any higher order mode than the predetermined mode in the light having the predetermined wavelength propagating from one side of the FBG to the FBG and the power of the light in any higher order mode than the predetermined mode in the light having the predetermined wavelength propagating from the other side of the FBG to the FBG can be inhibited. Therefore, even in a case where the light having the predetermined wavelength propagates either from the one side or other side of the FBG to the FBG, the power of cladding-mode light due to reflection of part of the light having the predetermined wavelength by the FBG can be inhibited, thus, local heat generation can be inhibited.

A laser apparatus according to one or more embodiments of the invention includes: the filter device described above; and a light source that emits the light having the predetermined wavelength, in which the optical fiber propagates the light emitted from the light source, and the FBG transmits the light having the predetermined wavelength transmitted through the higher-order mode filter after emitted from the light source, and reflects the light having the particular wavelength.

In the laser apparatus as above, although the light having the predetermined wavelength emitted from the light source propagates in multimode in the optical fiber, the power of the light in any higher order mode than the predetermined mode is inhibited by the higher-order mode filter. Thus, the light with inhibition of the power of the light in any higher order mode than the predetermined mode is transmitted through the FBG. At this time, part of the light having the predetermined wavelength is likely to be reflected at a specific angle relative to the exact opposite direction to the incident direction to the FBG. However, the power of a higher-order mode of light that tends to be cladding-mode light, in the reflected light, is inhibited. Therefore, the laser apparatus according to one or more embodiments of the invention enables inhibition of local heat generation.

As described above, one or more embodiments of the invention provide the filter device and the laser apparatus that enable inhibition of local heat generation.

DETAILED DESCRIPTION

A filter device and a laser apparatus according to one or more embodiments of the invention will be described in detail below with reference to the drawings. The embodiment to be exemplified below is intended for easy understanding of the invention. Thus, the invention is not limited to the embodiment. Alternations and improvements may be made without departing from the spirit of the invention. Note that, for easy understanding, the dimensions of each member in the drawings for reference below are changed, in some cases.

Figure 1:
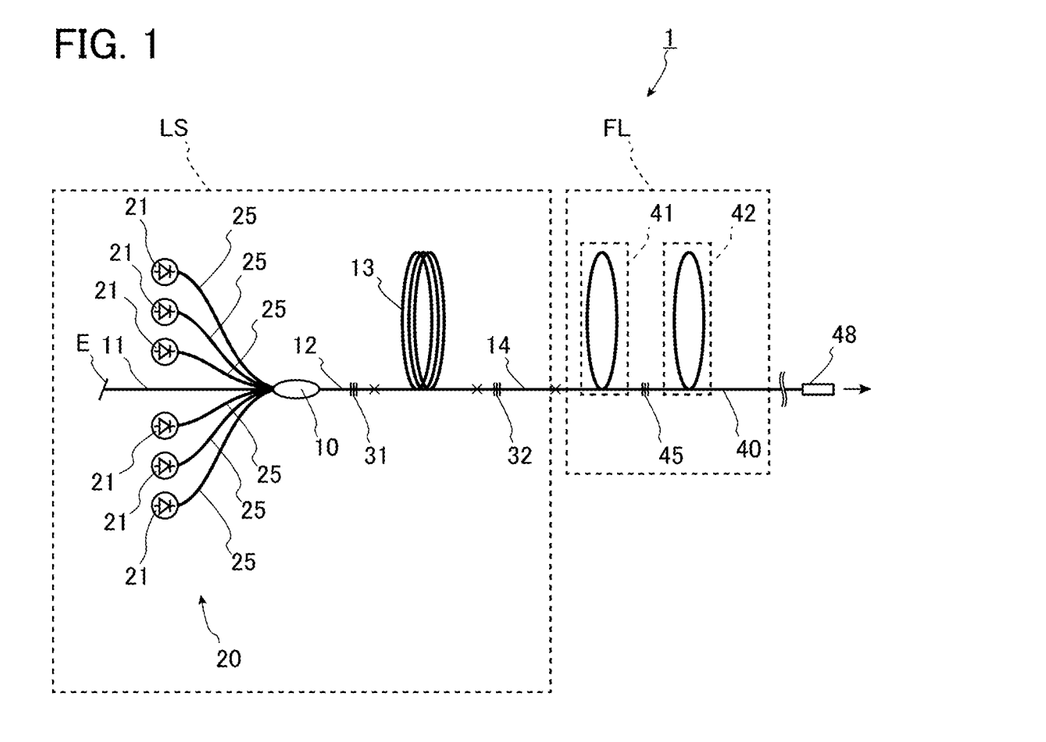
FIG. 1 illustrates a laser apparatus according to one or more embodiments of the invention.

FIG. 1 illustrates a laser apparatus according to one or more embodiments. As illustrated in FIG. 1, a laser apparatus 1 according to one or more embodiments includes a light source LS and a filter device FL.

The light source LS includes mainly: a pumping light source 20 that emits pumping light; an amplification optical fiber 13 that the pumping light emitted from the pumping light source 20 enters, the amplification optical fiber 13 being doped with an active element that pumps by the pumping light; an optical fiber 12 connected to one end of the amplification optical fiber 13; a high-reflective FBG 31 with which the optical fiber 12 is provided; a combiner 10 that enters the pumping light to the optical fiber 12; an optical fiber 14 connected to the other end of the amplification optical fiber 13; and a low-reflective FBG 32 with which the optical fiber 14 is provided. The amplification optical fiber 13, the high-reflective FBG 31, and the low-reflective FBG 32 are constituents of a resonator, and the light source LS according to one or more embodiments serves as an apparatus of fiber laser resonator.

The pumping light source 20 includes a plurality of laser diodes 21 and emits pumping light having a wavelength that pumps the active element doped to the amplification optical fiber 13. Each laser diode 21 in the pumping light source 20 is connected to a pumping optical fiber 25. Light that the laser diodes 21 each emit propagates in the pumping optical fiber 25 optically connected to the laser diode 21. Examples of such a pumping optical fiber 25 include a multimode fiber. In this case, the pumping light propagates, as multimode light, in the pumping optical fiber 25. Note that, in a case where the active element doped to the amplification optical fiber 13 is ytterbium as described below, the wavelength of the pumping light is, for example, 915 nm.

The amplification optical fiber 13 includes a core, an inner cladding surrounding the outer circumferential face of the core without any space, an outer cladding covering the outer circumferential face of the inner cladding, and a sheath covering the outer circumferential face of the outer cladding.

Examples of the material of the core of the amplification optical fiber 13 include quartz doped with an element, such as germanium, that causes a rise in refractive index, and an active element, such as ytterbium (Yb), that pumps by the light emitted from the pumping light source 20. Examples of such an active element include a rare-earth element, the rare-earth element include thulium (Tm), cerium (Ce), neodymium (Nd), europium (Eu), and erbium (Er), in addition to ytterbium described above. Examples of the active element further include bismuth (Bi), in addition to the rare-earth element. Examples of the material of the inner cladding of the amplification optical fiber 13 include pure quartz doped with no dopant and quartz doped with an element, such as fluorine, that causes a drop in refractive index. Examples of the material of the outer cladding of the amplification optical fiber 13 include a resin lower in refractive index than the inner cladding, and quartz doped with an element, such as fluorine, that causes a drop in refractive index. Examples of the material of the sheath of the amplification optical fiber 13 include an ultraviolet curable resin different from the resin included in the outer cladding.

In one or more embodiments, the amplification optical fiber 13 serves as a multimode fiber which supports 2 to 10 linearly polarized (LP) modes.

One end of the amplification optical fiber 13 is connected to the optical fiber 12, the core of the amplification optical fiber 13 and the core of the optical fiber 12 are optically coupled together, and the inner cladding of the amplification optical fiber 13 and the inner cladding of the optical fiber 12 are optically coupled together. The optical fiber 12 is the same in configuration as the amplification optical fiber 13 except for the core doped with no active element. Therefore, the optical fiber 12 serves as a multimode fiber.

The core of the optical fiber 12 is provided with the high-reflective FBG 31. That is, the high-reflective FBG 31 is provided closer to the one end of the amplification optical fiber 13. The high-reflective FBG 31 has a portion high in refractive index repeating in a certain period along the longitudinal direction of the optical fiber 12. Adjustment of the period causes the high-reflective FBG 31 to reflect light having a particular wavelength in light that the active element having been pumped in the amplification optical fiber 13 radiates. In a case where the active element doped to the amplification optical fiber 13 is doped is ytterbium as described above, the high-reflective FBG 31 reflects, for example, light having a wavelength of 1070 nm, for example, with a reflectivity of 99% or more.

In the combiner 10, the core of each pumping optical fiber 25 is connected to the inner cladding of the optical fiber 12. That is, the pumping optical fibers 25 connected to the pumping light source 20 are optically coupled to the inner cladding of the amplification optical fiber 13 through the inner cladding of the optical fiber 12.

In the combiner 10, an optical fiber 11 is connected to the optical fiber 12. For example, the optical fiber 11 has a core the same in diameter as the core of the optical fiber 12. One end of the optical fiber 11 is connected to the optical fiber 12, the core of the optical fiber 11 and the core of the optical fiber 12 are optically coupled together. A thermal converter E is connected on the opposite side to the combiner 10 side of the optical fiber 11.

The other end of the amplification optical fiber 13 is connected to the optical fiber 14, the core of the amplification optical fiber 13 and the core of the optical fiber 14 are optically coupled together. The optical fiber 14 includes a core similar to the core of the amplification optical fiber 13 except for being doped with no active element, a cladding that surrounds the outer circumferential face of the core without any space and is similar in configuration to the inner cladding of the amplification optical fiber 13, and a sheath covering the outer circumferential face of the cladding. Therefore, the optical fiber 14 serves as a multimode fiber.

The core of the optical fiber 14 is provided with the low-reflective FBG 32. That is, the low-reflective FBG 32 is provided closer to the other end of the amplification optical fiber 13. The low-reflective FBG 32 has a portion high in refractive index repeating in a certain period along the longitudinal direction of the optical fiber 14, and reflects light having a wavelength as at least part of the light that the high-reflective FBG 31 reflects, with a reflectivity lower than that of the high-reflective FBG 31. For example, the low-reflective FBG 32 reflects light having a wavelength identical to the wavelength of the light that the high-reflective FBG 31 reflects, with a reflectivity of 50%. Therefore, in a case where the high-reflective FBG 31 reflects light having a wavelength of 1070 nm as above, part of the light having the wavelength is transmitted through the low-reflective FBG 32, and then the transmitted light is emitted from the optical fiber 14. The light is multimode light, and the wavelength of the light is equivalent to the wavelength of light that resonates due to the resonator including the amplification optical fiber 13, the high-reflective FBG 31, and the low-reflective FBG 32. Hereinafter, in some cases, the light is referred to as signal light.

An optical fiber 40 is connected on the opposite side to the amplification optical fiber 13 side of the optical fiber 14. The optical fiber 40 serves as a delivery fiber that propagates the signal light emitted from the light source LS. That is, in one or more embodiments, the light source LS includes up to a portion including at least the low-reflective FBG 32 in the optical fiber 14.

The filter device FL includes mainly the optical fiber 40, a first higher-order mode filter 41, a FBG 45, and a second higher-order mode filter 42. The optical fiber 40 connected to the light source LS is similar in configuration to the optical fiber 14. Therefore, the optical fiber 40 serves as a multimode fiber and includes a core similar to the core of the amplification optical fiber 13 except for being doped with no active element, a cladding that surrounds the outer circumferential face of the core without any space and is similar in configuration to the inner cladding of the amplification optical fiber 13, and a sheath covering the outer circumferential face of the cladding. Note that, due to extension of the optical fiber 14, part of the optical fiber 14 may serve as the optical fiber 40.

The first higher-order mode filter 41 is provided on the light source LS side of the optical fiber 40. The first higher-order mode filter 41 removes at least part of the light in any higher order mode than a predetermined mode in the signal light in multimode that propagates in the optical fiber 40. For example, the first higher-order mode filter 41 removes the light in any higher order mode than $LP_{11}$ mode in the signal light in multimode that propagates in the optical fiber 40. In this case, on the opposite side to the light source LS side of the first higher-order mode filter 41, the light in $LP_{01}$ mode and the light in $LP_{11}$ mode propagate in the optical fiber 40, and the light in $LP_{21}$ mode, the light in $LP_{02}$ mode, and the light in any other higher-order modes are inhibited from propagating. Alternatively, for example, the first higher-order mode filter 41 removes the light in any higher order mode than $LP_{01}$ mode in the signal light in multimode that propagates in the optical fiber 40. In this case, on the opposite side to the light source LS side of the first higher-order mode filter 41, the light in $LP_{01}$ mode propagates in the optical fiber 40, and the light in $LP_{11}$ mode and the light in any other higher-order modes are inhibited from propagating. Note that a higher-order mode of light that the first higher-order mode filter removes is not limited to the above examples.

In one or more embodiments, the first higher-order mode filter 41 is a section bent with a predetermined diameter in the optical fiber 40. In a case where the wavelength of signal light that the light source LS emits is 1070 nm as above, for example, if the diameter of the core of the optical fiber 40 is 28 µm, the relative refractive index difference of the core to the cladding is 0.12%, and the light in any higher order mode than $LP_{11}$ mode is to be removed from the signal light in multimode that propagates in the core, the first higher-order mode filter 41 is a section bent with a diameter of 100 mm in the optical fiber 40. In a case where the diameter of the core of the optical fiber 40 and the relative refractive index difference of the core to the cladding are the same as those in the above example, if the light in any higher order mode than $LP_{01}$ mode is to be removed from the signal light in multimode that propagates in the core, the first higher-order mode filter 41 is a section bent with a diameter of 80 mm in the optical fiber 40.

Figure 2:
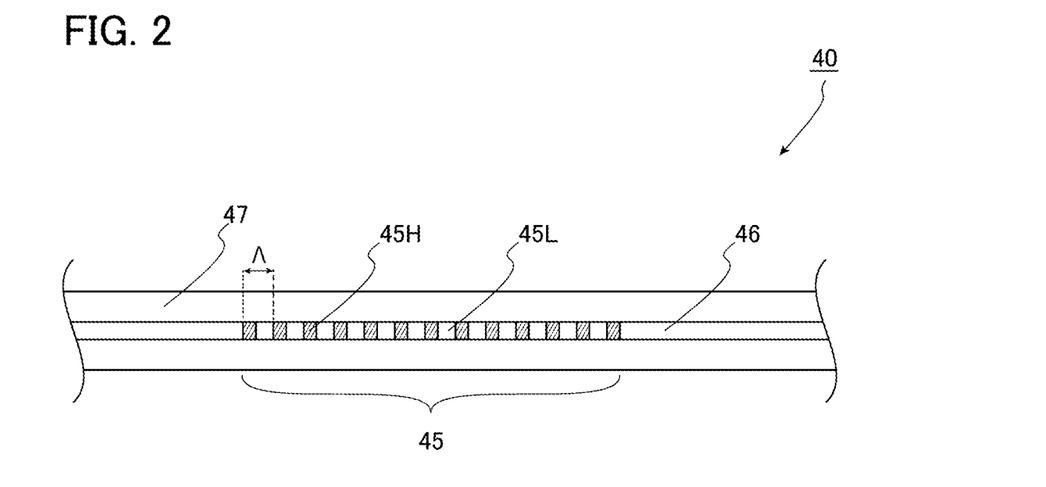
FIG. 2 is a schematic view of a fiber Bragg grating (FBG).

The FBG 45 is provided on the opposite side to the light source LS side of the first higher-order mode filter 41 in the optical fiber 40. FIG. 2 is a schematic view of the FBG 45. The FBG 45 has a high-refractive-index portion 45H higher in refractive index than a core 46 surrounded by a cladding 47 of the optical fiber 40 and a low-refractive-index portion 45L equivalent in refractive index to the core 46 that repeat alternately. Note that, in FIG. 2, for simplification of the figure, the high-refractive-index portions 45H and the low-refractive-index portions 45L are indicated less in number than those in the actual FBG. The FBG 45 in the present example has the interface between each high-refractive-index portion 45H and each low-refractive-index portion 45L, orthogonally to the longitudinal direction of the core 46. The FBG 45 transmits the light having a predetermined wavelength propagating in the optical fiber 40 after emitted from the light source LS therethrough and reflects, to the light source LS, the light having a particular wavelength longer than the predetermined wavelength. In one or more embodiments, for the FBG 45, the signal light emitted from the light source LS corresponds to the light having the predetermined wavelength, and Stokes light due to stimulated Raman scattering of the signal light corresponds to the light having the particular wavelength. Therefore, the FBG 45 transmits the signal light therethrough and reflects the Stokes light generating from the signal light, in the exact opposite direction to the propagation direction of the Stokes light incident on the FBG 45. Therefore, the FBG 45 reflects the Stokes light to the light source LS.

In the FBG 45 according to one or more embodiments, the interface between each high-refractive-index portion 45H and each low-refractive-index portion 45L is perpendicular to the longitudinal direction of the core. In a case where the effective refractive index of the core 46 is defined as $n_{eff}$, the pitch of the FBG 45 is defined as $\Lambda$, and the wavelength of light that the FBG 45 reflects is defined as $\lambda_1$, the pitch $\Lambda$ has a level such that the following expression is satisfied; $\lambda_1=2n_{eff}\Lambda$. Thus, for example, in a case where the wavelength of signal light that the light source LS emits is defined as $\lambda_2$ and the wavelength of Stokes light generating from the signal light is defined as $\lambda_1$, $\lambda_2=1070$ nm as above leads to $\lambda_1=1125$ nm. In this case, for example, $n_{eff}=1.450$ leads to $\Lambda=388$ nm.

A second higher-order mode filter 42 is provided on the opposite side to the first higher-order mode filter 41 side of the FBG 45 in the optical fiber 40. Therefore, the FBG 45 according to one or more embodiments is interposed between a pair of higher-order mode filters. In one or more embodiments, the second higher-order mode filter 42 is similar in configuration to the first higher-order mode filter 41.

The leading end of the optical fiber 40 is connected with a glass rod 48 thicker in diameter than the core 46. Therefore, light emitted from the core 46 is widened in diameter by the glass rod 48 for emission.

Next, the operation of the laser apparatus 1 will be described.

First, pumping light is emitted from each laser diode 21 in the pumping light source 20. The pumping light emitted from the pumping light source 20 enters from the pumping optical fibers 25 to the inner cladding of the amplification optical fiber 13 through the inner cladding of the optical fiber 12. The pumping light incident on the inner cladding of the amplification optical fiber 13 propagates mainly in the inner cladding and pumps, at the time of passing through the core of the amplification optical fiber 13, the active element with which the core is doped. The active element having been pumped radiates spontaneous emission light, at the time of returning to the ground state. The spontaneous emission light propagates in the core of the amplification optical fiber 13, then, the light having a part of wavelength is reflected by the high-reflective FBG 31 and the light having the wavelength that the low-reflective FBG 32 reflects in the reflected light is reflected by the low-reflective FBG 32, so that the light oscillates between the high-reflective FBG 31 and the low-reflective FBG 32, namely, in the resonator. The light is amplified due to stimulated emission at the time of propagation in the core of the amplification optical fiber 13, resulting in being in laser oscillation. Then, part of the amplified light is transmitted through the low-reflective FBG 32 and then is emitted from the optical fiber 14. As above, the optical fiber 14 serves as a multimode fiber and thus signal light in multimode is emitted from the light source LS.

The signal light emitted from the light source LS enters the optical fiber 40. As above, because the optical fiber 40 serves as a multimode fiber, the signal light propagates, in multimode, in the optical fiber 40. When the signal light propagates in the first higher-order mode filter 41, the light in any higher order mode than the predetermined mode leaks from the core 46, resulting in removal. As above, in a case where the first higher-order mode filter 41 removes the light in any higher order mode than $LP_{11}$ mode in the signal light in multimode that propagates in the optical fiber 40, the light in $LP_{01}$ mode and the light in $LP_{11}$ mode propagate from the first higher-order mode filter 41 to the FBG 45 in the optical fiber 40, and the light in $LP_{21}$ mode, the light in $LP_{02}$ mode, and the light in any other higher-order modes are inhibited from propagating. As above, in a case where the first higher-order mode filter 41 removes the light in any higher order mode than $LP_{01}$ mode in the signal light in multimode that propagates in the optical fiber 40, the light in $LP_{01}$ mode propagates from the first higher-order mode filter 41 to the FBG 45 in the optical fiber 40, and the light in $LP_{11}$ mode and the light in any other higher-order modes are inhibited from propagating.

When the signal light enters the FBG 45, the signal light is transmitted through the FBG 45. The signal light transmitted through the FBG 45 propagates in the second higher-order mode filter 42. The light in any higher order mode than the predetermined mode in the signal light has been removed by the first higher-order mode filter 41. Therefore, the second higher-order mode filter 42 removes the light in any higher order mode than the predetermined mode that the first higher-order mode filter 41 was not able to remove or the light in any higher order mode than the predetermined mode excited after transmission through the first higher-order mode filter 41. Therefore, the signal light transmitted through the second higher-order mode filter 42 has a further improvement in beam quality.

The light transmitted through the second higher-order mode filter 42 enters the glass rod 48, so that the light having the diameter widened is emitted as emitted light. A workpiece or the like is irradiated with the emitted light.

In some cases, part of the emitted light with which a workpiece or the like is irradiated is reflected from the workpiece and then enters the glass rod 48, so that part of the light having entered enters the core 46 of the optical fiber 40. The light propagates as returning light in the optical fiber 40 in the direction to the light source LS, namely, in the backward direction. As above, the signal light emitted from the light source LS propagates in the optical fiber 40 in the direction to the glass rod 48, namely, in the forward direction. Thus, combination of the energy of the light in the forward direction and the energy of the light in the backward direction causes a rise in the energy density of the light in the core 46 of the optical fiber 40. Due to such a rise in the energy density of the light in the core 46 of the optical fiber 40 as above, part of the light that propagates from the light source LS or part of the returning light is likely to cause stimulated Raman scattering, resulting in transition to Stokes light. The Stokes light can propagate in the forward direction and in the backward direction. Note that, in a case where the signal light is large in power, Stokes light can generate even with no returning light that propagates in the backward direction.

As above, the FBG 45 reflects the Stokes light in the exact opposite direction to the propagation direction of the Stokes light incident on the FBG 45. Therefore, in a case where the Stokes light generating between the light source LS and the FBG 45 enters the FBG 45, the Stokes light reflected by the FBG 45 propagates in the core 46 to the light source LS. In a case where the Stokes light generating between the FBG 45 and the glass rod 48 enters the FBG 45, the Stokes light reflected by the FBG 45 propagates in the core 46 to the glass rod 48.

Even such a FBG that reflects light having a particular wavelength longer than a predetermined wavelength as above reflects part of light having the predetermined wavelength shorter than the particular wavelength, at a specific angle relative to the exact opposite direction to the incident direction to the FBG. Therefore, the FBG 45 that reflects the Stokes light as above reflects part of the signal light shorter in wavelength than the Stokes light, obliquely to the longitudinal direction of the core 46. In a case where part of the emitted light with which a workpiece or the like is irradiated is reflected from the workpiece and then propagates as returning light in the optical fiber 40 to the light source LS, because the returning light is the same in wavelength as the signal light, the FBG 45 reflects part of the returning light obliquely to the longitudinal direction of the core 46.

As the mode of light gets higher in order, the optical confinement ability of a core is low. Now, assumed is a step-index optical fiber having a V number of 6.0. The V number is called the normalized frequency and is given by the following expression. Note that, in the following expression, a represents the radius of the core of an optical fiber, λ represents the wavelength of light that propagates in the optical fiber, $n_1$ represents the refractive index of the core of the optical fiber, and no represents the refractive index of the cladding of the optical fiber.

$$V = \frac{2\pi a}{\lambda}\sqrt{n_1^2 - n_0^2}$$

For a step-index optical fiber having a V number of 6.0, the mode of light capable of propagating in the core includes six modes that are, in order from the lowest mode order, $LP_{01}$ mode, $LP_{11}$ mode, $LP_{21}$ mode, $LP_{02}$ mode, $LP_{31}$ mode, and $LP_{12}$ mode. For the confinement rate of light of the respective modes to the core, $LP_{01}$ mode is 98%, $LP_{11}$ mode is 95%, $LP_{21}$ mode is 90%, $LP_{02}$ mode is 88%, $LP_{31}$ mode is 83%, and $LP_{12}$ mode is 67%. Thus, a higher-order mode of light reduces the confinement ability of the core, resulting in easy leakage from the core.

Therefore, a higher-order mode of light in the signal light reflected obliquely to the longitudinal direction of the core 46 by the FBG 45 tends to propagate in the cladding, resulting in being easy cladding-mode light. However, from the signal light according to one or more embodiments, the light in any higher order mode than the predetermined mode is removed by the first higher-order mode filter 41. Thus, in comparison to a case where no light in any higher order mode than the predetermined mode is removed by the first higher-order mode filter 41, the signal light reflected obliquely to the longitudinal direction of the core 46 by the FBG 45 is inhibited from being cladding-mode light.

As above, at the time of transmission of the returning light the same in wavelength as the signal light through the second higher-order mode filter 42, the light in any higher order mode than the predetermined mode is removed. The returning light with the removal transmitted through the second higher-order mode filter 42 is transmitted through the FBG 45. As above, part of the returning light is reflected obliquely to the longitudinal direction of the core 46 by the FBG 45. However, in one or more embodiments, the light in any higher order mode than the predetermined mode is removed from the returning light by the second higher-order mode filter 42. Thus, in comparison to a case where no light in any higher order mode than the predetermined mode is removed by the second higher-order mode filter 42, the signal light reflected obliquely to the longitudinal direction of the core 46 by the FBG 45 is inhibited from being cladding-mode light.

As described above, according to one or more embodiments, the signal light propagates to the FBG 45 through the first higher-order mode filter 41, resulting in inhibition of the power of a higher-order mode of light in the signal light incident on the FBG 45. Thus, even in the component of the signal light reflected at a specific angle relative to the exact opposite direction to the propagation direction of the signal light incident on the FBG 45, inhibited is the power of a higher-order mode of light that tends to be cladding-mode light. Therefore, the filter device FL according to one or more embodiments enables, even in a case where the light reflected by the FBG 45 becomes cladding-mode light, inhibition of the power thereof, thus, local heat generation can be inhibited.

The first higher-order mode filter 41 and the second higher-order mode filter 42 according to one or more embodiments are each a section bent with the predetermined diameter in the optical fiber 40. Therefore, the first higher-order mode filter 41 and the second higher-order mode filter 42 can be each achieved with a simple configuration.

In one or more embodiments, the FBG 45 is interposed between a pair of higher-order mode filters that are the first higher-order mode filter 41 and the second higher-order mode filter 42. Therefore, the power of the light in any higher order mode than the predetermined mode in the signal light that propagates to the FBG 45 and the power of the light in any higher order mode than the predetermined mode in the returning light that propagates to the FBG 45 can be inhibited. Therefore, the power of cladding-mode light due to reflection of part of the signal light and part of the returning light incident on the FBG 45 by the FBG 45 can be inhibited, thus, local heat generation can be inhibited.

Therefore, the laser apparatus 1 including the filter device FL as above can inhibit local heat generation.

The embodiment of the invention has been described above. However, the invention is not limited to this, and thus appropriate alternations may be made.

Figure 3:
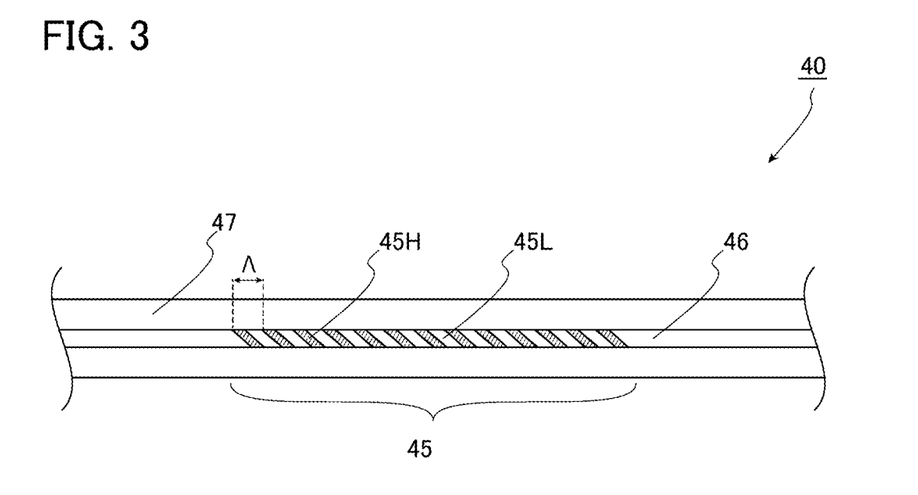
FIG. 3 is a schematic view of another exemplary FBG.

In one or more embodiments, for example, the FBG 45 has the interface between each high-refractive-index portion 45H and each low-refractive-index portion 45L, orthogonally to the longitudinal direction of the core 46. However, the FBG 45 according to the present embodiment is not limited to this. FIG. 3 is a schematic view of another exemplary FBG 45. Note that, for description with FIG. 3, unless otherwise noted, constituents the same as or similar to those according to the embodiment are denoted with the same reference signs, and the duplicate description thereof will be omitted. As illustrated in FIG. 3, the FBG 45 may be a slanted FBG. The slanted FBG has the interface between each high-refractive-index portion 45H and each low-refractive-index portion 45L, at a specific angle, different from a right angle, to the longitudinal direction of the core 46. For example, the interface is provided at an angle of 2.5 degrees to the longitudinal direction of the core 46. Even with such a slanted FBG, part of signal light incident on the FBG 45 is reflected at a specific angle relative to the exact opposite direction to the incident direction to the FBG 45. Therefore, as described above, the first higher-order mode filter 41 removes the light in any higher order mode than the predetermined mode in the signal light, so that the signal light reflected obliquely to the longitudinal direction of the core 46 by the FBG 45 is inhibited from being cladding-mode light. As described above, the second higher-order mode filter 42 removes the light in any higher order mode than the predetermined mode in the returning light, so that the signal light reflected obliquely to the longitudinal direction of the core 46 by the FBG 45 is inhibited from being cladding-mode light.

In one or more embodiments, the light source LS that serves as an apparatus of fiber laser resonator has been exemplarily given. However, the invention is not limited to this, and thus the light source LS is required at least to enter light having the predetermined wavelength to the optical fiber 40. For example, the light source LS may be a master oscillator power amplifier (MO-PA) fiber laser apparatus. The light source LS may be a solid-state laser apparatus, such as a semiconductor laser apparatus, or may be a gas laser apparatus.

The filter device FL according to one or more embodiments includes the second higher-order mode filter 42, but does not necessarily include the second higher-order mode filter 42. Even in a case where the second higher-order mode filter 42 is provided, the second higher-order mode filter 42 is not necessarily similar in configuration to the first higher-order mode filter 41. For example, the first higher-order mode filter 41 may remove the light in any higher order mode than $LP_{11}$ mode and the second higher-order mode filter 42 may remove the light in any higher order mode than $LP_{01}$ mode.

The first higher-order mode filter 41 and the second higher-order mode filter 42 are each required at least to remove at least part of the light in any higher order mode than the predetermined mode in the light in multimode that propagates in the optical fiber 40. Therefore, the first higher-order mode filter 41 and the second higher-order mode filter 42 are each not necessarily a section bent with the predetermined diameter in the optical fiber 40, and thus may each have a form different from that according to one or more embodiments.

According to one or more embodiments of the invention, provided are the filter device and the laser apparatus that enable inhibition of local heat generation and are utilizable in various industries, such as a laser processing field and a medical field.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A filter device comprising:
    an optical fiber that propagates multimode light having a predetermined wavelength;
    a first higher-order mode filter that removes at least part of the propagating multimode light that has a mode order higher than a predetermined mode order; and
    a fiber Bragg grating that:
        transmits the multimode light transmitted through the higher-order mode filter, and
        reflects light having a particular wavelength longer than the predetermined wavelength, wherein
    the optical fiber includes a cladding and a core with no active element,
    the first higher-order mode filter is a bent section of the optical fiber,
    the bent section has a predetermined diameter, and
    the fiber Bragg grating is disposed downstream of the first higher-order mode filter in a propagation direction of the light.

2. The filter device according to claim 1, wherein the fiber Bragg grating is a slanted fiber Bragg grating.

3. The filter device according to claim 1, wherein the first higher-order mode filter removes any light having a mode order higher than LP11.

4. The filter device according to claim 1, wherein the first higher-order mode filter removes any light having a mode order higher than LP01.

5. The filter device according to claim 1, wherein the light having the particular wavelength is Stokes light of the multimode light.

6. The filter device according to claim 1, further comprising a second higher-order mode filter, wherein
    the fiber Bragg grating is disposed between the first and second higher-order mode filter.

7. A laser apparatus comprising:
    the filter device according to claim 1; and
    a light source that emits the multimode light,
    wherein
    the optical fiber propagates the multimode light emitted from the light source, and the fiber Bragg grating transmits the multimode light transmitted through the higher-order mode filter after being emitted from the light source.

\* \* \* \* \*